United States Patent [19]
Ohm

[11] 3,900,231
[45] Aug. 19, 1975

[54] MOLDED TRACK FOR A TRACK-LAYING VEHICLE

[75] Inventor: George D. Ohm, Cuyahoga Falls, Ohio

[73] Assignee: The B. F. Goodrich Company, Akron, Ohio

[22] Filed: Oct. 23, 1973

[21] Appl. No.: 408,610

[52] U.S. Cl. ............................. 305/35 EB; 305/38
[51] Int. Cl.² ................................. B62D 55/24
[58] Field of Search ................. 305/35 EB, 38, 24

[56] References Cited
UNITED STATES PATENTS

| | | | |
|---|---|---|---|
| 3,118,709 | 1/1964 | Case | 305/57 |
| 3,480,339 | 11/1969 | Kell | 305/35 EB |
| 3,722,961 | 3/1973 | Haley | 305/38 |
| 3,761,143 | 9/1973 | Russ | 305/24 |
| 3,774,979 | 11/1973 | Harris | 305/35 EB |
| 3,781,067 | 12/1973 | Dodson | 305/35 EB |
| 3,815,960 | 6/1974 | Russ | 305/35 EB |

*Primary Examiner*—Philip Goodman
*Attorney, Agent, or Firm*—Harry F. Pepper, Jr.; W. A. Shira, Jr.

[57] ABSTRACT

An endless and substantially flat track for use with a track-laying vehicle which is supported by slide rails, with the track having an outer ground-engaging surface and an inner driving surface with drive lugs molded thereon. The track is imperforate and has a peripherally extending slide pad of a low frictional coefficient flexible material disposed in a position to engage the slide bar of the vehicle. The low frictional coefficient slide surface material is a non-thermoplastic woven fabric material which is integrally molded with the belt itself. The slide surface is peripherally coextensive with the inner surface of the belt.

7 Claims, 6 Drawing Figures

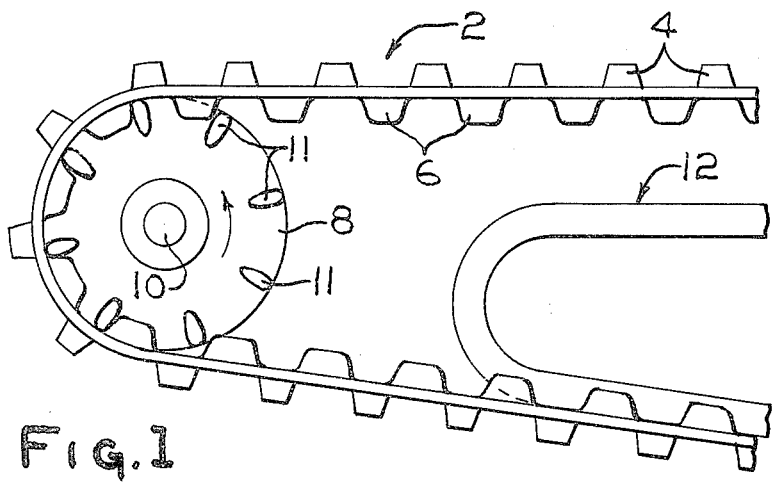
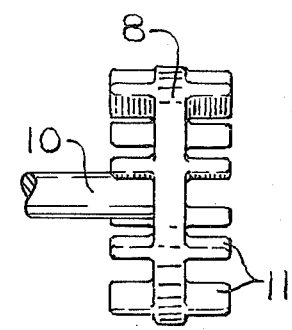
Fig.1    Fig.2
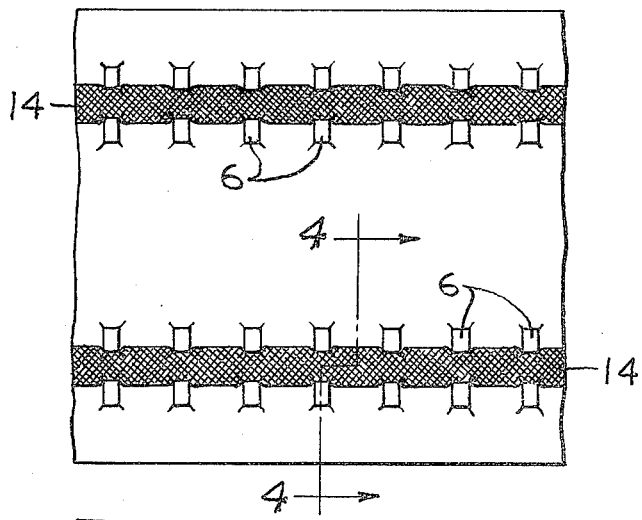
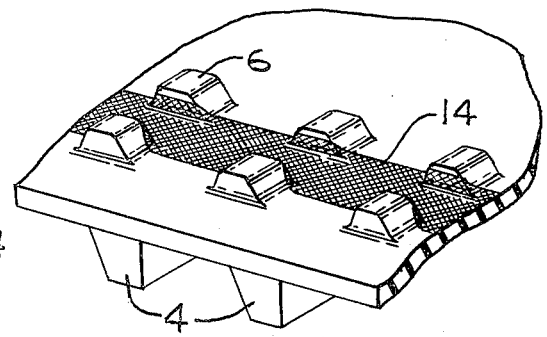
Fig.3    Fig.5
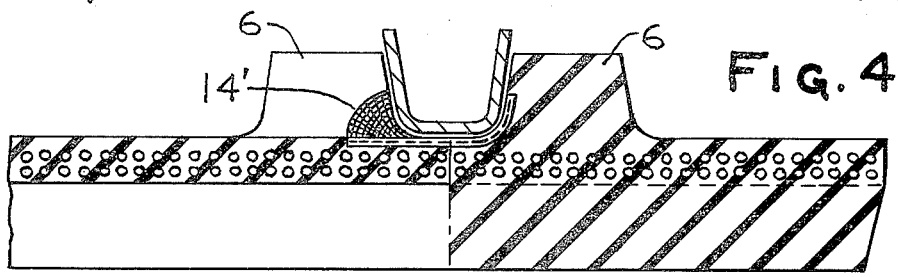
Fig.4
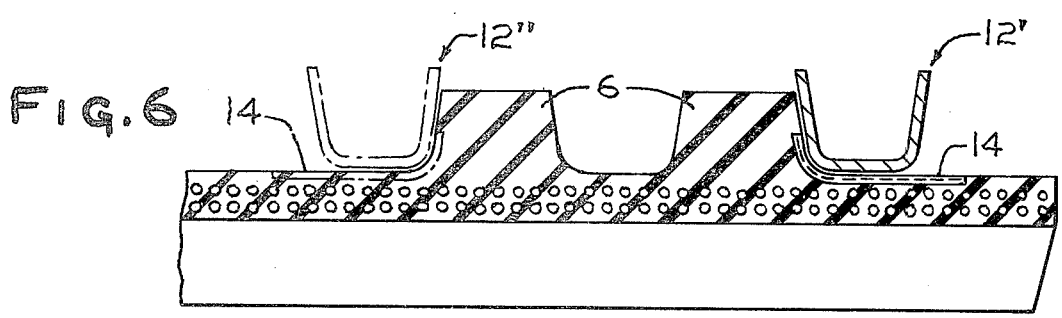
Fig.6

MOLDED TRACK FOR A TRACK-LAYING VEHICLE

BACKGROUND OF THE INVENTION

This invention relates to the field of endless tracks for track-laying vehicles and in particular for flexible tracks for snowmobiles. Tracks for snowmobiles, or the equivalent, are well known and consist of a variety of different forms and designs depending upon the particular driving and support structure of the vehicle. The considerations which prevail in connection with the design of snowmobile tracks include wear factors due to frictional forces, adequate positive engaging surfaces for the driving sprocket teeth, alignment and guiding of the belt or track on the supporting structure, and the strength and durability of the tread itself. Particularly troublesome problems arise in connection with a belt or track for a slide bar suspended snowmobile which will run dry, without any lubricant, and also a belt or track for a slide bar suspended snowmobile which will not become frozen solidly to the driving and support structure.

There are basically two different types of suspensions for snowmobiles. The first is characterized as a bogie wheel suspension. The bogie wheel suspension provides for rolling contact of several small wheels inside of the track. The other basic type of suspension is characterized as a slider bar suspension and is comprised of one or more bars or sliders extending longitudinally of the track and in sliding contact with the inside thereof. Each of the different types has its advantages and disadvantages.

The bogie wheel type of suspension provides a better ride over choppy terrain, and does not require lubrication from snow for operation. The slider bar type of suspension is considered to be faster and provides better flotation in powder snow. However, problems prevail in connection with the slider bar type of suspension due to the frictional forces developed by the sliding contact of the slider bars on the track. This is particularly troublesome in connection with "dry operation" of the track which prevails when snow or water is not available to lubricate the track and the slide. Further, very often the tracks will freeze to the slides when the snowmobile is left at rest for a period of time at sub-freezing temperatures.

There are basically two types of tracks which are used in connection with the snowmobiles. For convenience, these are generally regarded as being the grouser type of track and the molded rubber type of track.

The grouser bar type of track is comprised of two or three flat belts with grouser bars or cleats fastened thereto and extending transversely thereacross. Power is transmitted to the belt or track from sprockets running in spaces between the belts and engaging the cleats or grouser bars. This type of track is assembled from the various parts. In some cases the grouser bar type of track has drive lugs which are molded to the inner surface thereof.

In contrast to the aforementioned assembled or fabricated types of tracks, this invention relates to a fully molded internal drive lug track wherein the inside of the belt is molded with integral drive lugs and the outside thereof is provided with a tread pattern. The fully molded track is a unitary structure made as a single unit and requires no assembly of the various components such as the drive lugs, cleats, and slider pads.

SUMMARY OF THE INVENTION

In view of the foregoing, this invention provides a fully molded internal drive lug snowmobile track having integrally molded drive lugs on the inner surface of the track, a tread pattern molded on the outer surface thereof, and a low frictional coefficient material molded to the inner surface of the track in a position to slidingly engage the slide rails of the vehicle.

An object of this invention is to provide a fully molded track having integral drive lugs and an integrally molded slide surface to thereby provide a track which has a low noise level, even at high speeds.

Another object of this invention is to provide a fully molded track having integral drive lugs and slide surface wherein the drive lugs also provide lateral or transverse support of the track with respect to the slide rails to alleviate detracking.

Another object of the invention is to provide a snowmobile track having a slide surface of a low frictional coefficient which will permit operation of the vehicle and track under dry conditions without serious deleterious effects to the track or slider.

Another object of the invention is to provide an integrally molded snowmobile track having a slide surface which will not become solidly frozen to the slide bar when left at rest in a sub-freezing environment.

Another object of the invention is to provide a snowmobile tract which is relatively inexpensive in construction, light in weight, long in service life, and requires minimum power to operate.

DETAILED DESCRIPTION OF THE INVENTION

Referring now to the drawings,

FIG. 1 is an elevational view showing a fragment of a snowmobile track and its relationship to a slide rail.

FIG. 2 is an elevational view of the drive sprocket and drive shaft.

FIG. 3 is a plan view of a portion of the inner surface of a typical track showing the molded drive lugs and the preferred relationship of the low frictional coefficient slide surface with respect thereto.

FIG. 4 is a sectional view of the track when along lines 4—4 of FIG. 3 showing the manner in which the slide surface wraps around the walls of drive lugs to provide a lateral bearing surface for the sides of the slide rails.

FIG. 5 is a perspective view, enlarged, of a fragment of the track.

FIG. 6 is a sectional view of a track embodying an alternative design of the invention wherein a pair of slide surfaces are provided along the outside edges of the drive lugs.

Referring now more particularly to FIG. 1, the track, generally indicated by reference numeral 2, is comprised of a flexible belting material, preferably fabric reinforced, including a tread 4 upon the outer surface thereof and drive lugs 6 integrally molded to the inner surface. The track is an endless belt which extends from an idler drum mounted on the rear of the snowmobile, not shown, around drive sprocket 8 which is driven by drive shaft 10 operatively connected to the motor means of the vehicle. The drive sprocket 8 has drive teeth 11 positioned around the outer periphery thereof, positioned to engage the drive lugs 6 on the inner surface of the track. The relationship between the teeth 11 of the sprocket 8 and the lugs 6, as viewed in FIG. 1, is shown with the drive sprocket rotating counterclockwise.

In a preferred embodiment the drive shaft 10 mounts at least two drive sprockets but a single, centrally located drive sprocket is suitable and in some cases three drive sprockets are employed. In the single sprocket track a single row of pairs of drive lugs would be spaced essentially centrally of the transverse dimension of the track with the drive shaft also mounting disc-shaped members without sprocket teeth to engage the track near the transverse extremities thereof. As illustrated in FIG. 3, the preferred embodiment includes two essentially parallel transversely spaced rows of pairs of drive lugs on the track.

The vehicle frame mounts at least one slide rail, generally indicated at 12 in FIG. 1. The track of this invention is particularly adapted for use in connection with the slide rail type of suspension as exemplified by U.S. Pat. No. 3,485,312, dated Dec. 23, 1969, to Lowell B. Swenson et al, and entitled "Snowmobile Tread Drive and Suspension System." Since the details of the suspension structure itself form no part of the present invention, the slide bars will be described only generally, and it will be understood that the same may take varying forms.

One of the service problems with a slide rail and molded snow track combination or system is caused by the freezing of the rails to the track when the snowmobile is left at rest. In operation, this molded track and slide rail system generally relies upon melted snow for slide lubrication. However, under certain conditions the refrozen melt water is sufficient to adhere the slide to the track when the vehicle is stopped for even short periods of time. When this occurs, the adhesion level may be high enough that the engine torque is insufficient to break the bond. If the operator is not aware that the slide rail is frozen to the track and attempts to operate the machine, the transmission drive belt will burn and fail.

The severity of the freezing problem appears to be dependent upon both the material from which the slide rail itself is made and also upon the material on the track which it engages.

Slide bars or rails have been made from various materials such as high molecular weight polyethylene (HIFAX), mild steel, 303 stainless steel, 2024 aluminum and hard surface chrome plate on mild steel, for example.

While slides of different materials are suitable for this invention, it is preferred to employ a steel slide having a hard chrome plating thereon, at least at the wear surfaces. In particular, a hollow or tubular slide is often used. It is found that the heat due to friction and also freezing problems are minimized by the employment of this type of slide bar.

As mentioned, under normal operation the slide relies upon melted snow to provide a lubricant between it and the track. However, in "dry operation" the slide will quickly degrade the surface upon which it engages the belt unless provisions are made to reduce friction. A typical prior art solution to this problem is exemplified by U.S. Pat. No. 3,738,714, dated June 12, 1973, to William G. Ness, entitled "Tread for Motor Driven Vehicles." This typical prior art belt has a plurality of individual or discrete slide surfaces mechanically secured to the belt around the inner periphery thereof for engagement with the slide rail. It will be appreciated that the belt itself will be perforated if the low frictional coefficient slide blocks are to be secured with fasteners. In any event, however fastened, an assembly step is required. This assembling operation increases the manufacturing expense, and further, perforating the track reduces its strength.

Referring now more particularly to FIGS. 3-6, applicant overcomes the slide friction problems by providing a peripherally extending low frictional coefficient slide surface 14 on the inner surface of the belt. In a preferred embodiment the slide surface 14 is comprised of a woven fabric which is integrally molded with the surface of the belt so that is does not project thereabove but is essentially coplanar therewith. During manufacture the slide surface material 14 is applied to the track and molded or cured as an integral part of the belt.

One preferred arrangement of the slide bar and drive lugs with respect to the slide surface is illustrated in FIG. 4. In this embodiment the slide surface is disposed between the spaced lugs 6 to engage the slide rails 12. It will be noted that the slide surface 14 is somewhat wider than the space between the drive lugs. Accordingly, during the molding process the fabric is stretched slightly to thereby essentially conform to the side wall surfaces of the drive lugs. The resulting slid surface on the opposed facing lateral walls of the lugs provides a low coefficient bearing surface for the side walls of the slide rails. This is significant to provide low frictional loss bearing surface for lateral support of the vehicle, especially in turning. The slide rail of the embodiment illustrated in FIG. 4 is essentially held captive in the space between the opposed walls or faces of the drive lugs. Optionally, a plurality of plies of slide surface material, as denoted 14', may be employed. In either case it is preferred that the slide surface material extend a distance upwardly along the side wall of the drive lugs.

FIG. 6 shows an alternative design of slide bar suspension which employs a slide bar(s) 12' disposed outwardly of the drive lugs 6. In certain cases two spaced slide bars 12' and 12'' may be employed to bridge the drive lugs. In both cases a low frictional coefficient slide surface 14 is employed. Again, it is preferred that the slide pad material extend upwardly along the walls of the lugs to provide a lateral low coefficient bearing surface for the walls of the slide rails.

The track itself, whether or not reinforced, is made of a suitable elastomeric material as is the tread surface and the drive lugs. In practice the drive lugs would normally be made of a different, but compatible, elastomeric material than that used in the carcass of the belt.

While numerous different non-thermoplastic materials such as silk, flax, viscose rayon, etc., may be used, it is preferred to use cotton for the fabric of the slide surface. Cotton, surprisingly, was found to be even more durable and abrasion resistant than nylon or "Dacron" polyester (thermoplastics) generally regarded as having a higher abrasion resistance than cotton. It is important that the slide surface material be comprised of a fabric made largely of non-thermoplastic yarns spun from staple fibers, as a thermoplastic becomes softened at elevated temperatures and is degraded by the abrasion to which the slide surface is subjected.

Of the various fabrics which are suitable, it is preferred to use a square weave having essentially the same number of warp yarns, as filler or welt yarns. Further, it is found that a bias cut fabric gives better performance, from a durability standpoint, than a square cut fabric.

It has been found that an optimum relationship of frictional resistance, resistance to slider freezing and durability with "dry slider" operation is attained if the yarn from which the fabric is made has a relatively high twist, as measured in turns per inch.

A fabric which has been found to be particularly suitable for a slide surface of this invention is a plain weave cotton duck weighing 8.5 ounces per square yard, an end count of 44 × 44, and comprised of two ply yarns of a 16/2 designation with a twist multiplier (T.M.) of 4.95 in the singles and 17 turns per inch of ply twist (6.0 ply twist multiplier).

It is preferred that the fabric have a high twist multiplier (T.M.) as expressed by the relationship:

$$TM = \frac{T}{C}$$

where
$T = $ *turns per inch*
$C = $ cotton count

The twist multiplier is a qualitative index of the relative steepness of the helix angle in spun yarns. For cotton, for example, twist multipliers range from 2.5 for soft twisted yarns to 6 or more for very hard twisted yarns. It is preferred to employ yarn having T.M.'s of at least 4 for the slider surface fabric used in this invention. It is also preferred to employ a fabric having at least 25 warp ends per inch and 25 pick ends per inch.

While not critical, it is also preferred for some applications to employ more than one ply of slider surface fabric as indicated at 14 and 14' in FIGS. 4 and 6.

Other similarly woven fabrics made of cotton and polyester blends are suitable.

Fabrics made entirely from various thermoplastic materials have been used but due to lack of resistance to slider freezing, lack of abrasion and/or heat resistance, or both, were found to be inferior in performance to the preferred non-thermoplastic materials and blends.

It is necessary that the non-thermoplastic content of the fabric be adequate to protect the thermoplastic yarns from softening and melting due to heat. If a thermoplastic blend fabric is used, it is necessary that the non-thermoplastic cotton be used in sufficient quantity to effectively prevent the heat due to friction from softening and melting the thermoplastic constituent. Because of the number of variables involved, it is difficult to specify the quantative level of non-thermoplastic constituent required in a particular fabric for a particular application. In general, however, it is found that the fabric must have at least 50 percent, by weight, of non-thermoplastic such as cotton.

In one method of making the track of this invention, the fabric is "spread processed" before it is applied to the carcass of the belt for further processing. In spread processing, as used in describing this invention, one side of the slide surface fabric is given a thin coating of a Neoprene rubber cement compound and the other side thereof is given a plurality of coats of the Neoprene. Finally, the heavily coated side is given one or more coats of a tackifying Neoprene compound before the slide fabric was applied to the carcass. For convenience the description of this invention is presented in terms of a rubber track. However, other suitable resilient materials, such as polyurethane for example, having essentially the same in service properties as soft rubber may be used. The materials used for the drive lugs and tread, if different, must be bondable to the carcass material. The fabric coating cement must also be compatible and bondable to the elastomeric material.

Changes and modifications in the described embodiment will suggest themselves to those having ordinary skill in the art. Such changes and modifications are intended to be within the scope of the invention as defined by the appended claims.

I claim:

1. A flexible track for a track laying vehicle, the vehicle having at least one slide rail adapted to slidably engage the track, the track comprising:
an endless belt of elastomeric material, the belt having an inner periphery and an outer periphery,
drive engaging means molded around the inner periphery,
tread means molded upon the outer periphery thereof, and
at least one low friction slide rail bearing surface extending continuously longitudinally around the inner periphery of the belt wherein the bearing surface comprises a woven fabric, the fabric partially embedded in and integrally molded to the inner periphery of the belt and partially exposed for operative engagement with the at least one slide rail.

2. The flexible track of claim 1 further characterized in that the woven fabric is comprised of cotton.

3. The flexible track of claim 1 wherein the woven fabric is a plurality of superposed plies.

4. The track of claim 1 wherein the woven fabric has at least 25 warp ends per inch and 25 pick ends per inch.

5. The flexible track as defined in claim 1 wherein the drive engaging means comprise at least one row of peripherally extending and longitudinally spaced discrete drive lugs protruding from the belt and, the slide rail bearing surface is disposed contiguously to the at least one row of lugs and extends over a portion of each lug in the at least one row.

6. The flexible track of claim 5 wherein the drive engaging means comprise a plurality of the rows of drive lugs, the rows transversely spaced with the at least one slide rail bearing surface being disposed between any two adjacent rows of the plurality.

7. The track of claim 5 wherein the woven fabric is made of cotton duck fabric woven from yarns having a twist multiplier of at least 4.

* * * * *